Figure 1:
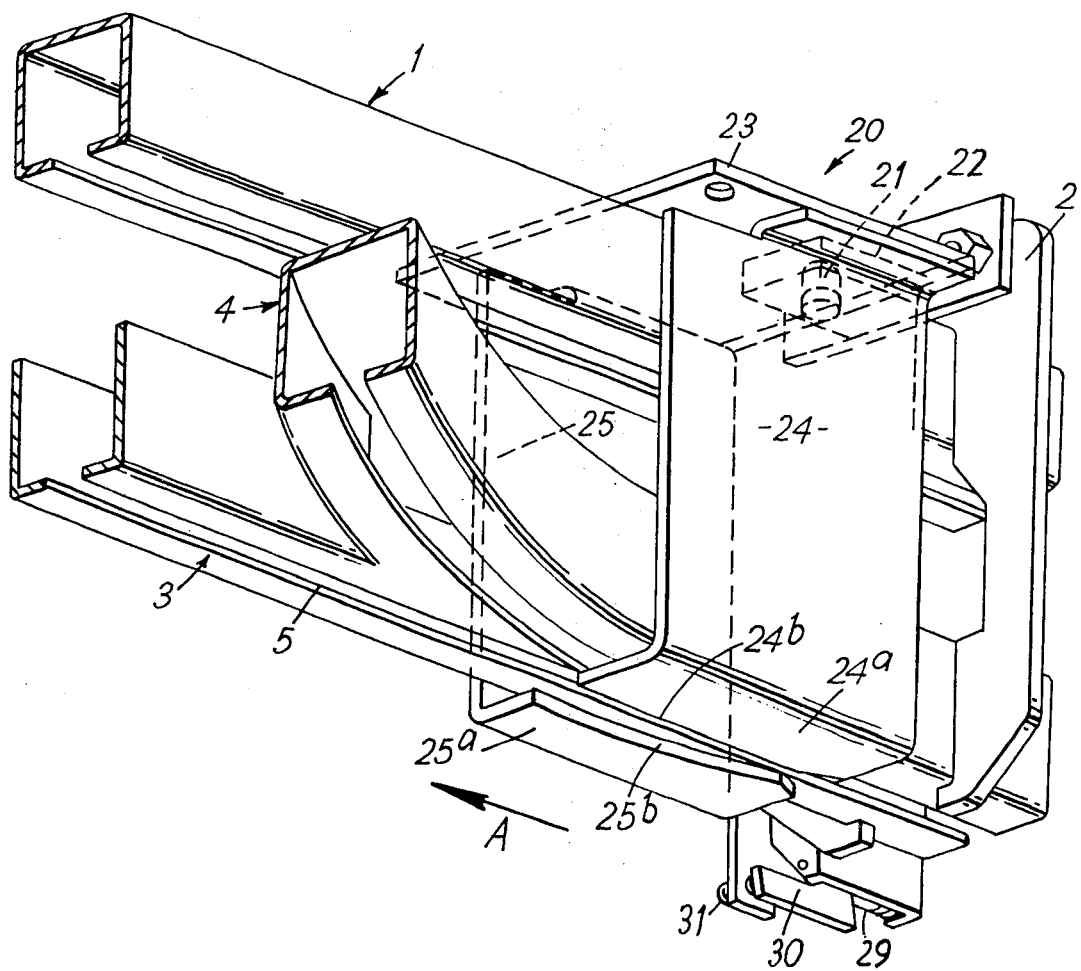

United States Patent

Henderson et al.

[11] 3,908,555
[45] Sept. 30, 1975

[54] CONVEYOR TRACK SWITCH

[75] Inventors: Thomas A. Henderson, Inglewood; Arthur Lee Hamill, Northridge, both of Calif.

[73] Assignee: Hytrac Conveyors Limited, England

[22] Filed: Feb. 22, 1974

[21] Appl. No.: 444,729

[52] U.S. Cl.............................. 104/130; 246/415 R
[51] Int. Cl.²........................................ B65G 17/44
[58] Field of Search............... 104/130, 88, 172 BT; 246/415 R

[56] References Cited
UNITED STATES PATENTS

| 3,474,738 | 10/1969 | DiRosa | 104/130 |
| 3,769,915 | 11/1973 | Swartz | 104/130 |

*Primary Examiner*—M. Henson Wood, Jr.
*Assistant Examiner*—Richard A. Bertsch
*Attorney, Agent, or Firm*—Larson, Taylor & Hinds

[57] ABSTRACT

Track switch for diverting load carriers from a main trackway into a branch trackway in a "power-and-free" or "free" type conveyor system. Switch comprises a frog connected between the main and branch trackways, and a load-carrier diverter pivotally mounted externally of the frog. Diverter has vertical plates on each side of the frog with inwardly-directed bottom margins having opposed guide edges for action on carrier guide elements projecting through a slot in the base of the frog. A pneumatic cylinder and ram device pivots the diverter between straight-through position and a divert position.

8 Claims, 5 Drawing Figures

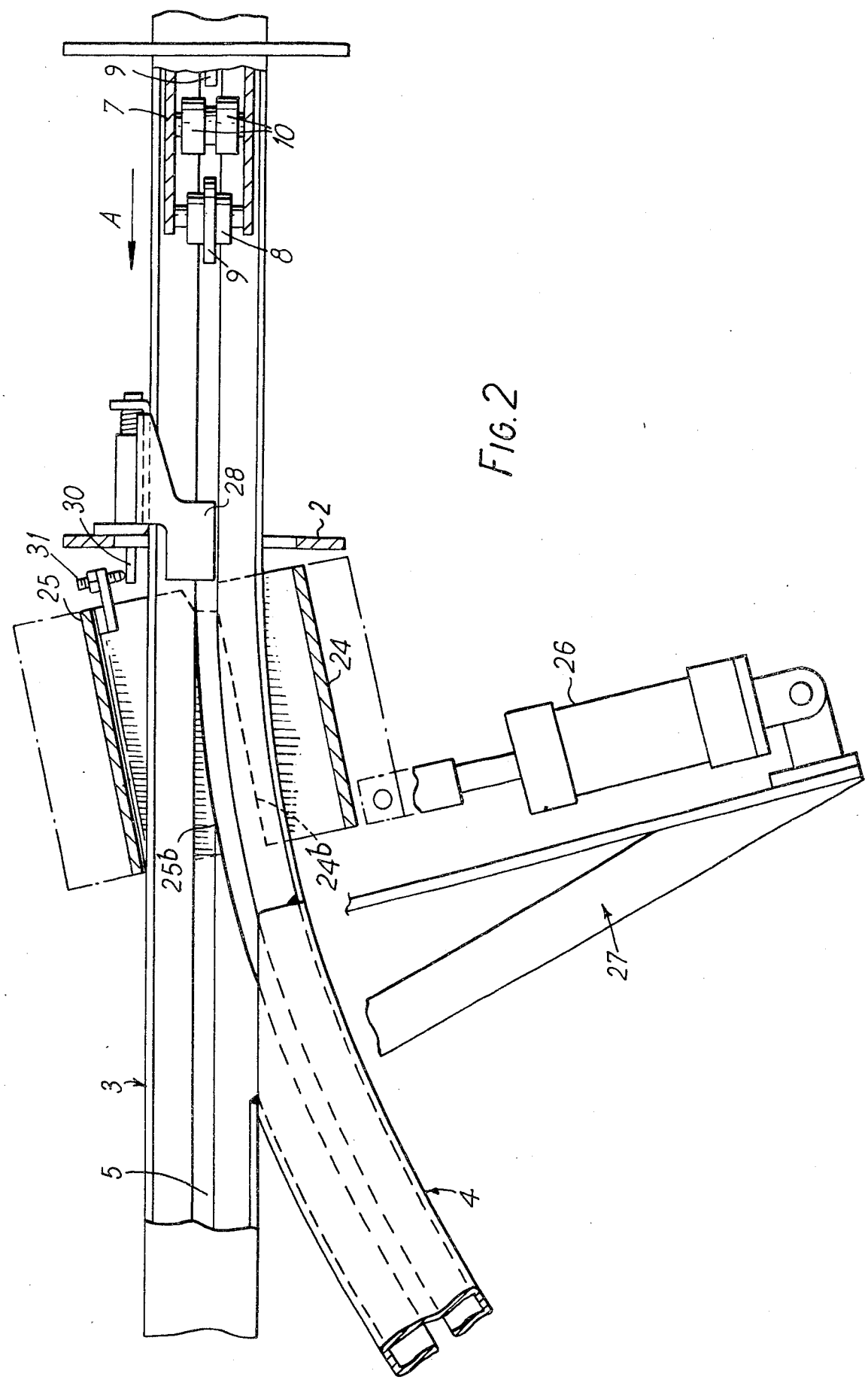

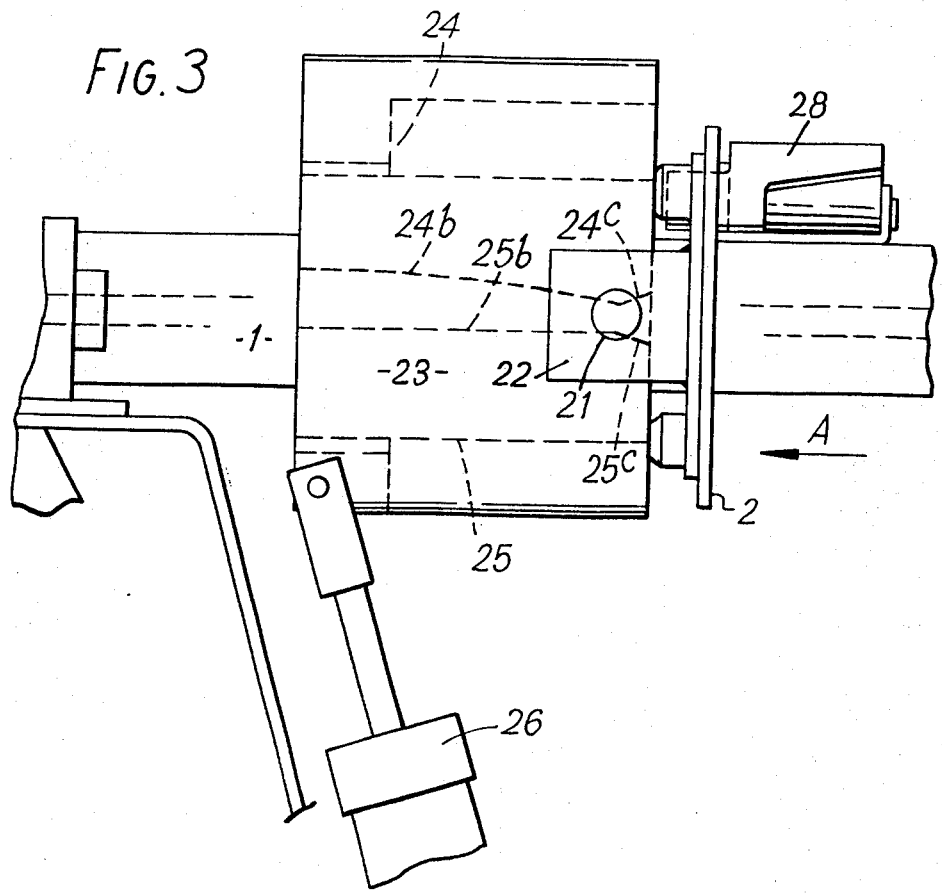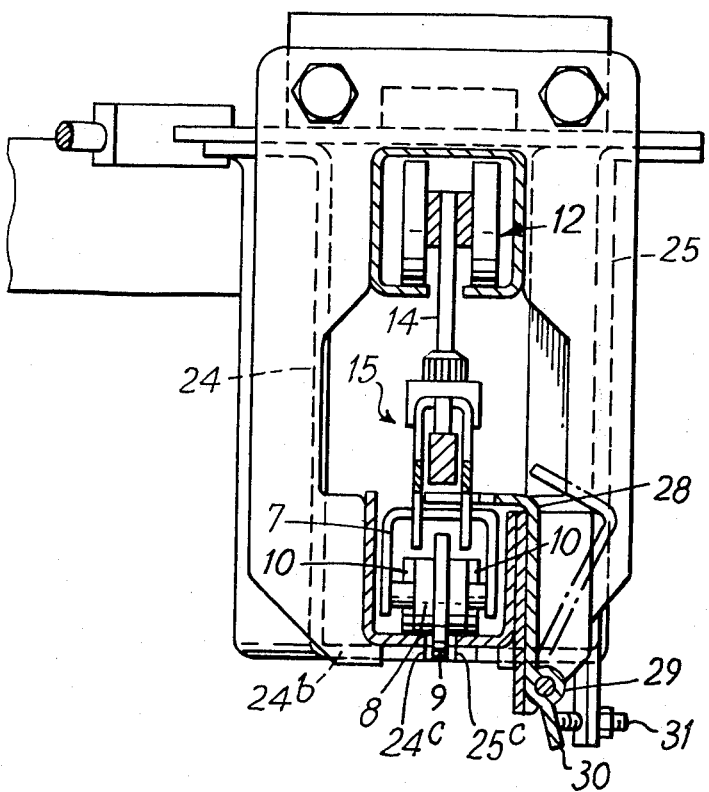

CONVEYOR TRACK SWITCH

This invention relates to conveyor systems of the kind in which individual load carriers travel in a trackway, and is in particular concerned with a conveyor track switch used in such systems to divert selected carriers from a main trackway into a branch trackway. The conveyor system may be a "power-and-free" type in which the carriers are driven by a separate driving means such as a driving conveyor chain which travels adjacent the trackway and to which the carriers can be drivably coupled at required times, or the system may be a "free" type in which the carriers are propelled by gravity.

In any event it is conventional to connect a branch trackway to the main trackway by a so-called "frog", which comprises a first track section connected in the main trackway and a second track section which branches out from the first at an acute angle and is joined to the branch trackway, the track sections of the frog being of the same cross-sectional shape as the main and branch trackways. The frog is used by itself at junctions where carriers enter the main trackway from the branch. However, where carriers are required to leave the main trackway and travel into the branch, the frog is converted into a track switch by a pivoted "tongue" which is mounted in the frog so as to be movable across the path of the carriers to divert them into the branch trackway. The carriers impinge directly on the tongue and are physically diverted by the latter. It will be appreciated that the impact loading on the tongue is high in that it must bear the full force of a loaded trolley. Consequently the tongue, its supporting pivot and the mechanism used to move the tongue are subject to repeated high energy shocks and therefore wear rapidly.

An object of the present invention is to provide an improved track switch which avoids this problem.

According to the invention there is provided, in a conveyor system of the kind comprising: a main trackway having a continuous longitudinal slot in its base; a branch trackway of the same cross-sectional shape as the main trackway; a plurality of load carriers which are freely movable in the trackway; and guide elements on the carriers which project through said longitudinal slot and below the trackway, a track switch comprising: a frog connected between the main and branch trackways and having in its base, slots which merge with said slots in the trackways; a load carrier diverter mounted externally of the frog for action on portions of the carrier guide elements which project below the base of the frog, the diverter being pivotally movable between a "straight-through" position in which the load carriers are unaffected and travel straight through the switch, and a divert position in which the diverter acts on the said portions of said guide formations projecting below the frog to divert the trolleys into the said branch trackway; and means for moving the diverter between said straight-through and divert positions.

It will be appreciated that the invention avoids the problem explained above in connection with conventional track switches in that the carriers are guided solely by way of the guide elements so that the load on the track switch is minimised. The rate of wear and risk of damage to the switch are therefore reduced.

Preferably the diverter is shaped to define a portion which extends below and parallel to the base of the frog, said portion having a guide edge which, when the diverter is in its straight-through position, extends parallel to the slot in the main trackway and is disposed at the side of the latter opposite to the branch trackway, and which, when the diverter is pivoted to its divert position, moves across the slot to divert incoming carriers into the branch trackway.

In some cases it may be necessary to provide means to prevent carriers accidentally passing into the branch trackway when the diverter is in its straight-through position. This may be accomplished by biassing the carriers themselves so that they always tend to go straight through the switch, or by a latch or the like which prevents the guide elements on the carriers passing into the branch trackway when the diverter is in the straight-through position.

Preferably, however, this is accomplished by shaping the diverter to define a second portion which extends below and parallel to the base of the frog at the side of the latter nearest the branch trackway, which second portion is formed with a guide edge arranged to align with the slot in the main trackway across the slot of the branch trackway so as to bar access to the latter when the diverter is in its straight-through position.

In a "power-and-free" type conveyor system further comprising a driving conveyor which extends parallel to and above the main trackway and drive dogs on said conveyor which can be releasably coupled with the load carriers in the main trackway, means may be provided for disengaging the drive dogs from the carriers at a position in advance of the diverter, said means being movable under the control of the diverter between an inoperative position when the diverter is in its straight-through position and an operative position to disengage said drive dogs when the diverter is in its divert position. This ensures that the carriers are released from the driving conveyor and can pass freely into the branch trackway, for example, under the control of a special take-off mechanism.

The guide elements on the carriers may be constituted by specially provided fingers or lugs which depend therefrom through the slot in the trackway. Preferably, however, where the carriers have wheels, the guide elements are constituted by peripheral ribs on selected wheels which project through the slots in the trackways.

The invention also provides a track switch for a conveyor system, comprising: a frog having longitudinal slots in the bases of its main and branch track sections; a load carrier diverter which is mounted externally of the frog and is pivotally movable between an inoperative position and a divert position, the diverter being adapted, when in said divert positions, to act on guide elements projecting through said slots from load carriers in the frog in use to divert the carriers into the branch track section of the frog; and means for moving the diverter between said inoperative and divert positions.

Further, a conventional frog may be converted to a track switch according to the invention. To this end the invention also provides a load carrier diverter for a frog, comprising: a carrier plate adapted to be mounted above the frog to pivot about a vertical axis passing through the latter; a pair of side plates which depend from the carrier plate at opposite sides of the frog and have inwardly-directed bottom marginal portions, the opposed edges of which form guide edges; and means for effecting pivotal movement of the diverter between an inoperative position and a divert position in use.

Figure 4:
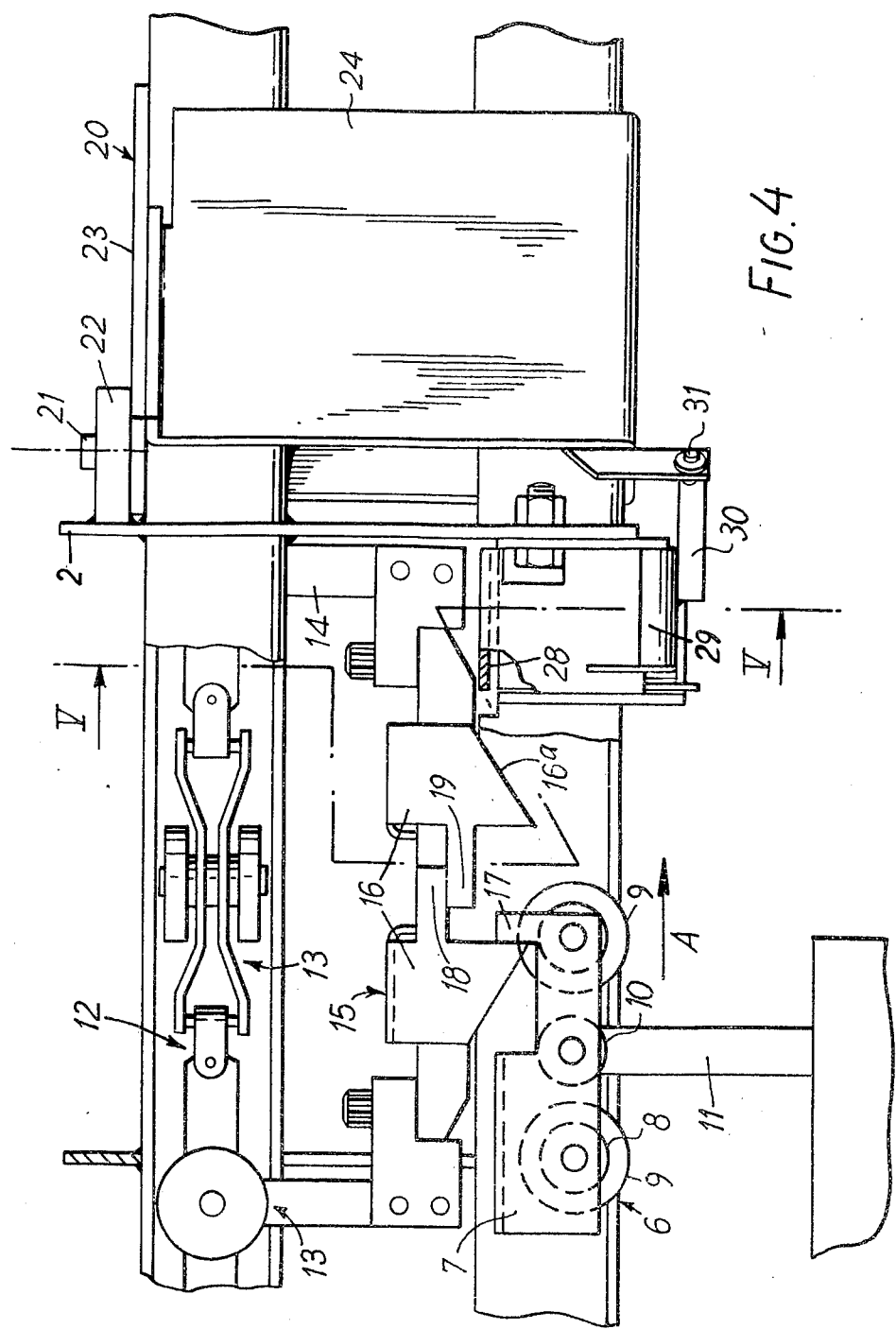

To facilitate understanding of the invention and enable it to be readily carried into practice, one embodiment thereof will now be described with reference to the accompanying drawings, in which:

FIG. 1 is a perspective view from below of a conveyor track switch in accordance with this embodiment of the invention, certain parts being omitted, FIG. 2 is a plan view corresponding to FIG. 1, shown partly in section and with the upper track omitted, the switch being set to divert carriers out of the main trackway into a branch trackway, FIG. 3 is a view similar to FIG. 2, with the switch shown in the straight ahead position, FIG. 4 is a side view of the switch shown in the previous Figures, with the upper and lower tracks partly sectioned to show the driving chain and the driven carriers, and, FIG. 5 is a vertical sectional view on line V — V of FIG. 4.

In FIGS. 1 to 4, the direction of movement of the carriers is indicated by arrows denoted 'A'.

The track switch shown in the drawings has been designed primarily for use in a conveyor system of the kind disclosed in U.S. Pat. application Ser. No. 426,458 "Conveyor Systems" filed Dec. 20, 1973 in the names Coleson and Wood and assigned to Hytrac Conveyors Limited. Basically, this system comprises a driving conveyor of the form described and claimed in U.S. Pat. No. 3,637,067 and a series of freely movable carriers arranged in a trackway below the driving chain and adapted to be releasably coupled to the chain during drive. The driving chain and one carrier are visible in FIG. 4 and will be more specifically described later.

In the drawings, the trackway for the driving chain is denoted 1 and is mounted in a support bracket 2 in an overhead position above and parallel to a second trackway in which the carriers run. Normally the carriers driven by the main chain 1 travel along in the main carrier trackway, but where they require to be diverted into a branch trackway (not visible) a switch of the form shown in FIG. 1 is employed.

The switch comprises a frog made up of a standard curved track section 4 joined to the branch trackway and a straight track section 3 connected in the carrier trackway. Trackway section 4 is welded into one side of section 3, the latter being gapped to receive the branch section. It will be noted that both section 3 and section 4 have a longitudinally extending slot 5 in their base. The construction is such that the slot 5 in section 4 merges into the slot in the main track section 3.

The frog can be used by itself in a situation in which carriers travel along the branch section 4 towards the main section 3 to joint the main trackway. In the present instance, however, carriers (travelling from right to left as indicated by arrow A — see FIG. 2) are to be diverted out of the main trackway and it will be appreciated that a diverter has to be added to the frog.

Before describing the diverter it will be convenient to refer to FIGS. 4 and 5 in explaining the construction of the trolleys.

Each trolley, denoted 6, comprises a body 7 of inverted U-shape between the side limbs of which are mounted a pair of spaced axles carrying main wheels 8 which, as can be seen from FIG. 5, are centrally located one at each end of the body 7. Each wheel 8 has a circumferential rib 9 which projects through and below the slot 5 in the trackway and by which the carrier is guided. In addition a pair of co-axial stabilising wheels 10 which run on the base of the trackway are provided in the region of the centre of the trolley, from the common axle of which is suspended a load-carrying pendant 11.

As mentioned above, the carriers 7 are driven from a main conveyor chain in trackway 1. This chain is denoted 12 in the drawings and comprises a plurality of wheeled links 13, alternate ones of which are arranged with their wheels vertical, whilst the wheels of the intervening links are horizontal. Pendants 14 depend from the vertical wheeled links and carry between them drive dogs, one of which is indicated at 15 in FIG. 4. Each dog basically comprises a pair of pivoted latches 16, the leading one of which has an inclined leading edge 16a which will ride up an obstruction in its path, causing the latch to turn in the anti-clockwise direction in FIG. 4 about its pivot. The trailing latch drivably engages a formation 17 on the carrier and has a forwardly projecting finger 18 which rests on a corresponding finger 19 on latch 16 so that the driving finger is lifted to disengage the drive when the leading latch 16 turns about its pivot on meeting an obstruction as described above. Both latches are gravity returned.

Returning now to the diverter and with particular reference to FIGS. 1 and 4, the diverter is generally denoted 20 and is mounted on the support bracket 2 for the conveyor trackways. Thus, the bracket has a forwardly projecting plate 21 mounted thereon which carries a pivot pin 22 for a carrier plate 23 which overlies the top trackway.

Projecting downwardly from plate 23 are a pair of vertical plates 24, 25 disposed one on each side of the trackways. These plates are turned inwardly at their lower margins 24a, 25a, their opposed edges 24b, 25b terminating adjacent the slot 5 in the carrier trackway.

The assembly comprising the plate 23 and the side plates 24 can therefore be pivoted as a whole about pin 22 between a straight-ahead position as shown in FIG. 2 and an inclined divert position as shown in FIG. 3. The opposed edges 24b, 25b of the turned under portions 24a, 25a of plate 24 are shaped as shown in FIGS. 1 and 3. Thus it will be noted that edge 24b is straight so that in the straight ahead position of the diverter it extends parallel to the walls of the slot 5 in the main carrier trackway 3. Edge 25b is of curved shape so that, in the divert position, it lies below and parallel to the edges of the curved slot 5 in the branch track section 4. Both edges 24b, 25b are cut away at the entry side of the mechanism as shown at 24c, 25c in FIG. 3.

A pneumatic cylinder 26 mounted on the frame 27 of the conveyor is provided for the purpose of pivoting the diverter.

The idea, then, is that the edges 24b, 25b of the diverter mechanism engage opposite sides of the circumferential rib 9 on the wheels 8 of a carrier so as to either guide the carrier straight along the main trackway 3 in the straight ahead position (FIG. 3) or to divert the carrier into the side section 4 in the FIG. 2 position of the diverter. It will be appreciated that, as the diverter mechanism acts laterally on the ribs only of the trolley wheels, it is subjected to very light loading and does not receive the full impact of a loaded trolley as in a conventional track switch. The stabilizer wheels 10 on the carrier prevent the latter tipping as it is diverted into the branch section 4.

Under certain circumstances it may be desirable for the drive from the driving chain 12 to a carrier to be disengaged before the carrier actually enters the branch section 4. This may be true, for example, where an auxiliary carrier driving mechanism is provided to move the carriers along the branch section 4 at high speed away from the main trackway.

For this purpose a pivoted latch 28 is provided immediately "upstream" of the diverter mechanism to disengage the drive from conveyor 1. As can be seen from FIG. 5, this latch is of inverted L-shape and is arranged so that, when in its operative position, its horizontal limb is disposed in the path of the leading latch 16 of the carrier driving dog so as to lift this latch and disengage the drive to the carrier.

Latch 28 is of the shape shown in plan in FIG. 3, being mounted on a pivot 29 adjacent the trackway. A lug 30 on latch 28 is abutted by a set screw 31 mounted in a bracket carried by one of the plates 25 of the diverter. A spring 32 on pivot pin 29 urges the latch into its operative position across the trackway. This is the situation when the diverter 20 is in the divert position as shown in FIG. 3. When the mechanism is moved back to the straight-ahead position, the set screw 31 acts on lug 30 to pivot the latch 28 against its spring-biassing into a retracted position indicated in chain lines in FIG. 5. In this position, the leading latch of the drive dog will not be lifted and the drive to the carriers will continue, the carrier travelling straight through the switch.

We claim:

1. In a conveyor system of the kind comprising: a main trackway having a continuous longitudinal slot in its base; a branch trackway of the same cross-sectional shape as the main trackway; a plurality of load carriers which are freely movable in the trackway; and guide elements on the carriers which project through said longitudinal slot and below the trackway, a track switch comprising: a frog connected between the main and branch trackways and having in its base, slots which merge with said slots in the trackways; a load carrier diverter mounted externally of the frog for action on portions of the carrier guide elements which project below the base of the frog, the diverter being pivotally movable between a "straight-through" position in which the load carriers are unaffected and travel straight through the switch, and a divert position in which the diverter acts on the said portions of said carrier guide elements projecting below the frog to divert the trolleys into the said branch trackway; and means for moving the diverter between said straight-through and divert positions, said diverter comprising an assembly formed by a carrier plate mounted above the frog to pivot about a vertical axis passing through the latter, and a pair of side plates which depend from the carrier plate at opposite sides of the frog and which have inwardly-directed bottom marginal portions, the opposed edges of which form guide edges.

2. A conveyor system according to claim 1, wherein the diverter is shaped to define a second portion which extends below and parallel to the base of the frog at the side of the latter nearest the branch trackway, which second portion is formed with said guide edges arranged to align with the slot in the main trackway across the slot of the branch trackway so as to bar access to the latter when the diverter is in its straight-through position.

3. A conveyor system according to claim 1, wherein said edges have outwardly flared surface portions at the input side of the diverter.

4. A conveyor system according to claim 1, wherein the means for moving the diverter between said straight-through and divert positions comprise a pneumatic cylinder and ram device which operate on said carrier plate.

5. A conveyor system according to claim 1, further comprising a driving conveyor which extends parallel to and above the main trackway; drive dogs on said conveyor which can be releasably coupled with the load carriers in the main trackway; and means for disengaging the drive dogs from the carriers at a position in advance of the diverter, said means being movable under the control of the diverter between an inoperative position when the diverter is in its straight-through position and an operative position to disengage said drive dogs when the diverter is in its divert position.

6. A conveyor system according to claim 1, wherein the carriers are provided with wheels which run in the trackway and wherein said guide elements on the carriers are constituted by peripheral ribs on selected carrier wheels which project through the longitudinal slots in the trackways.

7. A conveyor system according to claim 6, wherein each carrier has a front wheel and a rear wheel, each provided with one of said peripheral ribs, and a pair of plain intermediate stabilising wheels which run on the base of the trackway on opposite sides of the slot therein.

8. A load carrier diverter for a frog, comprising: a carrier plate adapted to be mounted above the frog to pivot about a vertical axis passing through the latter; a pair of side plates which depend from the carrier plate at opposite sides of the frog and have inwardly-directed bottom marginal portions, the opposed edges of which form guide edges; and means for effecting pivotal movement of the diverter between an inoperative position and a divert position in use.

* * * * *